United States Patent
Flosbach et al.

(10) Patent No.: US 8,518,173 B2
(45) Date of Patent: *Aug. 27, 2013

(54) LIQUID COATING COMPOSITION COMPRISING POLYURETHANE RESIN SAG CONTROL AGENTS

(76) Inventors: Carmen Flosbach, Wuppertal (DE); Olaf Ley, Wuppertal (DE); Tanja Renkes, Essen (DE)

( * ) Notice: Subject to any disclaimer, the term of this patent is extended or adjusted under 35 U.S.C. 154(b) by 1034 days.

This patent is subject to a terminal disclaimer.

(21) Appl. No.: 12/299,339

(22) PCT Filed: Apr. 26, 2007

(86) PCT No.: PCT/US2007/010025
§ 371 (c)(1), (2), (4) Date: Dec. 11, 2008

(87) PCT Pub. No.: WO2007/133407
PCT Pub. Date: Nov. 22, 2007

(65) Prior Publication Data
US 2011/0200756 A1 Aug. 18, 2011

Related U.S. Application Data

(60) Provisional application No. 60/797,776, filed on May 3, 2006.

(51) Int. Cl.
*D21H 17/07* (2006.01)

(52) U.S. Cl.
USPC ............ 106/287.25; 427/379; 427/385.5; 106/287.26; 106/287.3

(58) Field of Classification Search
USPC ............ 427/379, 385.5; 106/287.25, 287.26, 106/287.3
See application file for complete search history.

(56) References Cited

U.S. PATENT DOCUMENTS

2009/0317552 A1 * 12/2009 Flosbach et al. ............ 427/385.5

* cited by examiner

*Primary Examiner* — Robert S Walters, Jr.

(57) ABSTRACT

A liquid coating composition comprising a resin solids content comprising (i) a binder solids content comprising at least one hydroxyl-functional binder A and 0.5 to less than 5 wt. % of at least one polyurethane resin B with functional groups selected from the group consisting of hydroxyl groups, free isocyanate groups and blocked isocyanate groups and (ii) at least one cross-linker C, wherein the at least one polyurethane resin B is present as particles having a melting temperature of 40 to 200° C.

18 Claims, No Drawings

LIQUID COATING COMPOSITION COMPRISING POLYURETHANE RESIN SAG CONTROL AGENTS

FIELD OF THE INVENTION

The present invention relates to liquid coating compositions comprising specific polyurethane resins as sag control agents.

BACKGROUND OF THE INVENTION

It is known from DE 27 51 761, EP 0 198 519 and EP 0 192 304 to use specific urea compounds as sag control agents in liquid coating compositions. In certain liquid coating compositions, these urea compounds may give rise to unwanted haze phenomena in the coating layers applied and cured therefrom. It is known from U.S. Pat. No. 6,355,307 to overcome this haze problem in clear coats applied and cured from liquid clear coating compositions which do not cure by means of amino resin cross-linkers by simultaneously using small quantities of formaldehyde donors in the liquid clear coating compositions in addition to the urea compounds used as sag control agents.

It has now been found that specific polyurethane resins may successfully be used as sag control agents in liquid coating compositions based on hydroxyl-functional binders. Such liquid coating compositions require no addition of formaldehyde donors, even if they contain no amino resin.

SUMMARY OF THE INVENTION

The invention is directed to liquid coating compositions which comprise a resin solids content comprising (i) a binder solids content comprising at least one hydroxyl-functional binder A ("binder A" for short in the following) and 0.5 to less than 5 wt. % of at least one polyurethane resin B with functional groups selected from the group consisting of hydroxyl groups, free isocyanate groups and blocked isocyanate groups and wherein the at least one polyurethane resin B is present as particles having a melting temperature of 40 to 200° C., preferably, 60 to 180° C., and (ii) at least one cross-linker C.

DETAILED DESCRIPTION OF THE INVENTION

The coating compositions according to the invention are liquid, contain organic solvent(s) and/or water and have a solids content of, for example, 35 to 85 wt. %, preferably of 40 to 75 wt. %.

The solids content of the coating compositions comprises the solids contributions of components A, B, C and, optionally, D, and of the following optional components: pigments, fillers (extenders) and non-volatile additives. The components A, B, C and, optionally, D form the resin solids content of the coating compositions.

The resin solids content of the coating compositions comprises (i) the binder solids content comprising the at least one binder A and the at least one polyurethane resin B and (ii) the at least one cross-linker C. Preferably, the resin solids content of the coating compositions comprises 60 to 90 wt. % of the binders solids content, 10 to 40 wt. % of the at least one cross-linker C and 0 to 30 wt. % of one or more components D, wherein the weight percentages add up to 100 wt. %. It is preferred, that the resin solids content does not comprise any component(s) D and, in this case, it is preferred that the resin solids content consists of (i) 60 to 90 wt. % of the binder solids content consisting of more than 95 to 99.5 wt. % of one or more binders A and 0.5 to less than 5 wt. % of one or more polyurethane resins B, and (ii) 10 to 40 wt. % of the at least one cross-linker C, wherein the weight percentages in each case add up to 100 wt. %.

The coating compositions contain at least one binder A. The binder(s) A are not solid at room temperature but are, for example, liquid, and/or are soluble in an organic solvent (mixture) and/or are dilutable with water or a water/organic solvent mixture, for example, soluble or dispersible therein. Binder(s) A soluble in an organic solvent (mixture) are present in dissolved form in non-aqueous coating compositions according to the invention which contain organic solvent(s). Water-dilutable binder(s) A are present in dissolved or dispersed, for example, emulsified form in aqueous coating compositions according to the invention which optionally also contain organic solvent(s).

The binders A comprise conventional hydroxyl-functional binders known to the person skilled in the art, and are readily available commercially or may be prepared by conventional synthesis procedures. Examples are polyester, polyurethane and (meth)acrylic copolymer resins and hybrid binders derived from these classes of binders, in each case with hydroxyl values of, for example, 60 to 300 mg of KOH/g and number-average molar masses of, for example, 500 to 10000.

The number-average molar mass data stated in the presented herein are number-average molar masses determined or to be determined by gel permeation chromatography (GPC; divinylbenzene-cross-linked polystyrene as the immobile phase, tetrahydrofuran as the liquid phase, polystyrene standards).

The binders A may be present in dissolved form in an organic solvent (mixture). They may, however, also be converted into the aqueous phase, for example, with addition of external emulsifiers and water. Nonaqueous, but water-dilutable binders A contain conventional hydrophilic groups. Examples of these are nonionic hydrophilic groups, such as polyethylene oxide units, and/or ionic groups or groups convertible into ionic groups. Such binders A may be converted into the aqueous phase by addition of water or by addition of neutralizing agent and water. The ionic groups or groups convertible into ionic groups comprise in particular anionic groups or groups convertible into anionic groups, such as carboxyl groups, sulfonic acid groups, for example, corresponding to an acid value of 10 to 50 mg of KOH/g binder A. Binders A containing carboxyl groups may, for example, be converted into the aqueous phase by mixing with water once their carboxyl groups have been neutralized with bases, such as ammonia, amines or aminoalcohols. If an aqueous coating composition according to the invention is produced in the preferred manner, i.e., by adding the at least one polyurethane resin B to the at least one water-dilutable binder A, care must be taken to ensure that the at least one polyurethane resin B is added to the water-dilutable binder(s) A before converting the latter into the aqueous phase.

The coating compositions contain at least one polyurethane resin B with functional groups selected from the group consisting of hydroxyl groups, free isocyanate groups and blocked isocyanate groups, forming 0.5 to less than 5 wt. % of the binder solids content.

The polyurethane resins B are present in the coating compositions as particles and have a melting temperature of 40 to 200° C., preferably a melting temperature of 60 to 180° C. The melting temperatures are not, in general, sharp melting points, but instead are the upper end of melting ranges with a breadth of, for example, 30 to 150° C. The melting ranges and thus, the melting temperatures may be determined, for example, by DSC (differential scanning calorimetry) at heating rates of 10 K/min. In the embodiment of aqueous coating compositions the polyurethane resin B particles are present in the coating compositions, in particular, within the generally aqueously dispersed binder phase or binder-containing phase, respectively.

The polyurethane resins B are only very slightly, if at all, soluble in organic solvents and/or in water. The solubility is in the range of less than 10, in particular, less than 5 g per litre of butyl acetate or water at 20° C.

Polyurethane resin B with hydroxyl groups or blocked isocyanate groups are preferred. It is advantageous that the polyurethane resins B can be involved in the chemical cross-linking process with their hydroxyl or free isocyanate or blocked isocyanate groups during thermal curing of the coating layers applied from the coating compositions according to the invention.

The production of polyurethane resins B is known to the person skilled in the art. These resins may be produced by reacting polyol(s) with polyisocyanate(s) and, in case of isocyanate excess, reacting the excess free isocyanate groups with blocking agent(s). Polyols suitable for the production of the polyurethane resins B are not only polyols in the form of low molar mass compounds defined by empirical and structural formula, but also oligomeric or polymeric polyols with number-average molar masses of, for example, up to 800, for example, corresponding hydroxyl-functional polyethers, polyesters or polycarbonates. Low molar mass polyols defined by an empirical and structural formula are, however, preferred. In case of coating compositions to be used for the production of an outer coating layer, such as a top coat layer or a clear coat layer exposed to the natural sunlight, it is recommended not to use polyurethane resins B in the production whereof any aromatic compounds or building blocks have been used.

The polyurethane resins B may be produced in the presence of a suitable organic solvent (mixture), which, however, makes it necessary to isolate the polyurethane resins B obtained in this manner or remove the solvent therefrom. Preferably, the production of the polyurethane resins B is, however, carried out without solvent and without subsequent purification operations.

In a first embodiment the polyurethane resins B are hydroxyl-functional polyurethane resins B. They may be produced, for example, by reacting polyisocyanate(s) with polyol(s) in the excess. The hydroxyl-functional polyurethane resins B have hydroxyl values of, for example, 50 to 300 mg KOH/g.

In a first preferred variant of the first embodiment, the hydroxyl-functional polyurethane resins B are polyurethane diols which can be prepared by reacting 1,6-hexane diisocyanate or 4,4'-diphenylmethane diisocyanate with a diol component in the molar ratio x:(x+1), wherein x means any desired value from 2 to 6, preferably, from 2 to 4, and the diol component is one single diol, in particular, one single diol with a molar mass in the range of 62 to 600, or a combination of diols, preferably two to four, in particular two or three diols, wherein in the case of a diol combination each of the diols preferably constitutes at least 10 mol % of the diols of the diol component.

The diisocyanate and the diol component are reacted stoichiometrically with one another in the molar ratio x mol diisocyanate:(x+1) mol diol compound(s), wherein x means any desired value from 2 to 6, preferably from 2 to 4.

One single diol, in particular, one single diol with a molar mass in the range of 62 to 600 is used as the diol component. It is also possible to use a combination of diols, preferably two to four, in particular two or three diols, wherein each of the diols preferably constitutes at least 10 mol % of the diols of the diol component.

In the case of the diol combination, the diol component may be introduced as a mixture of its constituent diols or the diols constituting the diol component may be introduced individually into the synthesis. It is also possible to introduce a proportion of the diols as a mixture and to introduce the remaining proportion or proportions in the form of pure diol. Each of the diols preferably constitutes at least 10 mol % of the diols of the diol component.

Examples of diols which are possible as one single diol of the diol component are bisphenol A and (cyclo)aliphatic diols, such as, ethylene glycol, the isomeric propane- and butanediols, 1,5-pentanediol, 1,6-hexanediol, 1,10-decanediol, 1,12-dodecanediol, 1,4-cyclohexanedimethanol, hydrogenated bisphenol A and dimer fatty alcohol.

The term "(cyclo)aliphatic" used in the description and the claims encompasses cycloaliphatic, linear aliphatic, branched aliphatic and cycloaliphatic with aliphatic residues. Diols differing from (cyclo)aliphatic diols, i.e., non-(cyclo)aliphatic diols, accordingly comprise aromatic or araliphatic diols with aromatically and/or aliphatically attached hydroxyl groups.

Examples of diols which are possible as constituents of the diol component are oligomeric or polymeric diols, such as, telechelic (meth)acrylic polymer diols, polyester diols, polyether diols, polycarbonate diols, each with a number-average molar mass of, for example, up to 800; low molar mass non-(cyclo)aliphatic diols defined by empirical and structural formula, such as bisphenol A; (cyclo)aliphatic diols defined by empirical and structural formula with a low molar mass in the range of 62 to 600, such as, ethylene glycol, the isomeric propane- and butanediols, 1,5-pentanediol, 1,6-hexanediol, 1,10-decanediol, 1,12-dodecanediol, neopentyl glycol, butylethylpropanediol, the isomeric cyclohexanediols, the isomeric cyclohexanedimethanols, hydrogenated bisphenol A, tricyclodecanedimethanol, and dimer fatty alcohol.

The diisocyanate and the diol component are preferably reacted together in the absence of solvents. The reactants may here all be reacted together simultaneously or in two or more synthesis stages. When the synthesis is performed in multiple stages, the reactants may be added in the most varied order, for example, also in succession or in alternating manner. The diol component may, for example, be divided into two or more portions or into the individual diols, for example, such that the diisocyanate is initially reacted with part of the diol component before further reaction with the remaining proportion of the diol component. The individual reactants may in each case be added in their entirety or in two or more portions. The reaction is exothermic and proceeds at a temperature above the melting temperature of the reaction mixture. The reaction temperature is, for example, 60 to 200° C. The rate of addition or quantity of reactants added is accordingly determined on the basis of the degree of exothermy and the liquid (molten) reaction mixture may be maintained within the desired temperature range by heating or cooling.

Once the reaction carried out in the absence of solvent is complete and the reaction mixture has cooled, solid polyurethane diols are obtained. When low molar mass diols defined by empirical and structural formula are used for synthesis of the polyurethane diols, their calculated molar masses are in the range of 522 or above, for example, up to 2200.

The polyurethane diols assume the form of a mixture exhibiting a molar mass distribution. The polyurethane diols do not, however, require working up and may be used directly as hydroxyl-functional polyurethane resins B.

In a second preferred variant of the first embodiment, the hydroxyl-functional polyurethane resins B are polyurethane diols which can be prepared by reacting a diisocyanate component and bisphenol A or a diol component in the molar ratio x:(x+1), wherein x means any desired value from 2 to 6, preferably, from 2 to 4, wherein 50 to 80 mol % of the diisocyanate component is formed by 1,6-hexane diisocyanate, and 20 to 50 mol % by one or two diisocyanates, each forming at least 10 mol % of the diisocyanate component and being selected from the group consisting of toluylene diisocyanate, diphenylmethane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate, wherein the mol % of the respective diisocyanates add up to 100 mol %, wherein 20 to 100 mol % of the diol component is formed by at least one linear aliphatic alpha,omega-C2-C12-diol, and 0 to 80 mol % by at least one diol that is different from linear aliphatic alpha,omega-C2-C12-diols, wherein each diol of the diol component preferably forms at least 10 mol % within the diol component, and wherein the mol % of the respective diols add up to 100 mol %.

The diisocyanate component and the bisphenol A or the diol component are reacted stoichiometrically with one another in the molar ratio x mol diisocyanate:(x+1) mol diol compound(s), wherein x represents any value from 2 to 6, preferably from 2 to 4.

50 to 80 mol % of the diisocyanate component is formed by 1,6-hexane diisocyanate, and 20 to 50 mol % by one or two diisocyanates selected from the group consisting of toluylene diisocyanate, diphenylmethane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate, wherein if two diisocyanates are selected, each diisocyanate forms at least 10 mol % of the diisocyanates of the diisocyanate component. Preferably, the diisocyanate or the two diisocyanates, forming in total 20 to 50 mol % of the diisocyanate component, are selected from dicyclohexylmethane diisocyanate, isophorone diisocyanate, trimethylhexane diisocyanate, cyclohexane diisocyanate, cyclohexanedimethylene diisocyanate and tetramethylenexylylene diisocyanate.

The diol component consists to an extent of 20 to 100 mol % of at least one linear aliphatic alpha,omega-C2-C12-diol and to an extent of 0 to 80 mol % of at least one diol differing from linear aliphatic alpha,omega-C2-C12-diols. The diol component preferably consists of no more than four different diols, in particular only of one to three diols. In the case of only one diol, it accordingly comprises a linear aliphatic alpha,omega-C2-C12-diol. In the case of a combination of two, three or four diols, the diol component consists to an extent of 20 to 100 mol %, preferably of 80 to 100 mol %, of at least one linear aliphatic alpha,omega-C2-C12-diol and to an extent of 0 to 80 mol %, preferably of 0 to 20 mol % of at least one diol differing from linear aliphatic alpha,omega-C2-C12-diols and preferably, also from alpha,omega-diols with more than 12 carbon atoms. The at least one diol differing from linear aliphatic alpha,omega-C2-C12-diols and preferably, also from alpha,omega-diols with more than 12 carbon atoms comprises in particular diols defined by empirical and structural formula and with a low molar mass in the range of 76 to 600. In the case of a diol combination, each diol preferably makes up at least 10 mol % of the diol component.

Preferably, the diol component does not comprise any diols that are different from linear aliphatic alpha,omega-C2-C12-diols, but rather consists of one to four, preferably, one to three, and in particular only one linear aliphatic alpha,omega-C2-C12-diol.

In the case of the diol combination, the diol component may be introduced as a mixture of its constituent diols or the diols constituting the diol component may be introduced individually into the synthesis. It is also possible to introduce a proportion of the diols as a mixture and to introduce the remaining proportion or proportions in the form of pure diol. Each of the diols preferably constitutes at least 10 mol % of the diols of the diol component.

Examples of linear aliphatic alpha,omega-C2-C12-diols that may be used as one single diol of the diol component or as constituents of the diol component are ethylene glycol, 1,3-propanediol, 1,4-butanediol, 1,5-pentanediol, 1,6-hexanediol, 1,10-decanediol and 1,12-dodecanediol.

Examples of diols that are different from linear aliphatic alpha,omega-C2-C12-diols and may be used in the diol component are oligomeric or polymeric diols, such as, telechelic (meth)acrylic polymer diols, polyester diols, polyether diols, polycarbonate diols, each with a number-average molar mass of, for example, up to 800; low molar mass non-(cyclo)aliphatic diols defined by empirical and structural formula, such as, bisphenol A; (cyclo)aliphatic diols defined by empirical and structural formula with a low molar mass in the range of 76 to 600, such as, those isomers of propanediol and butanediol that are different from the isomers of propanediol and butanediol specified in the preceding paragraph, as well as, neopentyl glycol, butyl ethyl propanediol, the isomeric cyclohexanediols, the isomeric cyclohexanedimethanols, hydrogenated bisphenol A, tricyclodecanedimethanol, and dimer fatty alcohol.

The diisocyanate component and the bisphenol A or the diol component are preferably reacted together in the absence of solvents. The reactants may here all be reacted together simultaneously or in two or more synthesis stages. When the synthesis is performed in multiple stages, the reactants may be added in the most varied order, for example, also in succession or in alternating manner. The bisphenol A or the diol component may, for example, be divided into two or more portions or into the individual diols, for example, such that the diisocyanates are initially reacted with part of the bisphenol A or of the diol component before further reaction with the remaining proportion of the bisphenol A or of the diol component. Equally, however, the diisocyanate component may also be divided into two or more portions or into the individual diisocyanates, for example, such that the hydroxyl components are initially reacted with part of the diisocyanate component and finally with the remaining proportion of the diisocyanate component. The individual reactants may in each case be added in their entirety or in two or more portions. The reaction is exothermic and proceeds at a temperature above the melting temperature of the reaction mixture. The reaction temperature is, for example, 60 to 200° C. The rate of addition or quantity of reactants added is accordingly determined on the basis of the degree of exothermy and the liquid (molten) reaction mixture may be maintained within the desired temperature range by heating or cooling.

Once the reaction carried out in the absence of solvent is complete and the reaction mixture has cooled, solid polyurethane diols are obtained. When low molar mass diols defined by empirical and structural formula are used for synthesis of the polyurethane diols, their calculated molar masses are in the range of 520 or above, for example, up to 2200.

The polyurethane diols assume the form of a mixture exhibiting a molar mass distribution. The polyurethane diols do not, however, require working up and may be used directly as hydroxyl-functional polyurethane resins B.

If, in individual cases, a proportion of the dihydroxy compound(s) used for the synthesis of those polyurethane diols according to the first or second preferred variant of the first embodiment stated above is replaced by a triol component comprising at least one triol, polyurethane resins B are obtained which are branched and/or more highly hydroxyl-functional compared to the respective polyurethane diols. Variants with such polyurethane resins B are themselves further preferred variants of the first embodiment. For example, up to 70% of the dihydroxy compound(s) in molar terms may be replaced by the triol(s) of the triol component. Examples of triols usable as constituent(s) of a corresponding triol component are trimethylolethane, trimethylolpropane and/or glycerol. Glycerol is preferably used alone as a triol component.

In a second embodiment the polyurethane resins B are isocyanate-functional polyurethane resins B. They may be produced by reacting polyol(s) with polyisocyanate(s) in the excess. The polyurethane resins B have isocyanate contents of, for example, 2 to 13.4 wt. % (calculated as NCO, molar mass 42).

In a first preferred variant of the second embodiment, the isocyanate-functional polyurethane resins B are polyurethane diisocyanates which can be prepared by reacting 1,6-hexane diisocyanate or 4,4'-diphenylmethane diisocyanate with a diol component in the molar ratio (x+1):x, wherein x means any desired value from 2 to 6, preferably, from 2 to 4, and the diol component is one single diol, in particular, one single diol with a molar mass in the range of 62 to 600, or a combination of diols, preferably two to four, in particular, two or three diols, wherein in the case of a diol combination each of the diols preferably constitutes at least 10 mol % of the diols of the diol component.

The diisocyanate and the diol component are reacted stoichiometrically with one another in the molar ratio (x+1) mol diisocyanate:x mol diol compound(s), wherein x means any desired value from 2 to 6, preferably from 2 to 4.

With regard to the nature and use of the diol component and to the diols possible as constituents, in order to avoid repetition, reference is made to the statements made in relation to the first preferred variant of hydroxyl-functional polyurethane resins B.

The diisocyanate and the diol component are preferably reacted together in the absence of solvents. With regard to the sequence of addition of the reactants and the reaction conditions, in order to avoid repetition, reference is made to the statements made in relation to the first preferred variant of hydroxyl-functional polyurethane resins B.

Once the reaction carried out in the absence of solvent is complete and the reaction mixture has cooled, solid polyurethane diisocyanates are obtained. When low molar mass diols defined by empirical and structural formula are used for synthesis of the polyurethane diisocyanates, their calculated molar masses are in the range of 628 or above, for example, up to 2300.

The polyurethane diisocyanates assume the form of a mixture exhibiting a molar mass distribution. The polyurethane diisocyanates do not, however, require working up and may be used directly as isocyanate-functional polyurethane resins B.

In a second preferred variant of the second embodiment, the isocyanate-functional polyurethane resins B are polyurethane diisocyanates which can be prepared by reacting a diisocyanate component and bisphenol A or a diol component in the molar ratio (x+1):x, wherein x means any desired value from 2 to 6, preferably, from 2 to 4, wherein 50 to 80 mol % of the diisocyanate component is formed by 1,6-hexane diisocyanate, and 20 to 50 mol % by one or two diisocyanates, each forming at least 10 mol % of the diisocyanate component and being selected from the group consisting of toluylene diisocyanate, diphenylmethane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate, wherein the mol % of the respective diisocyanates add up to 100 mol %, wherein 20 to 100 mol % of the diol component is formed by at least one linear aliphatic alpha,omega-C2-C12-diol, and 0 to 80 mol % by at least one diol that is different from linear aliphatic alpha,omega-C2-C12-diols, wherein each diol of the diol component preferably forms at least 10 mol % within the diol component, and wherein the mol % of the respective diols add up to 100 mol %.

The diisocyanate component and the bisphenol A or the diol component are reacted stoichiometrically with one another in the molar ratio (x+1) mol diisocyanate:x mol diol compound(s), wherein x represents any value from 2 to 6, preferably from 2 to 4.

With regard to the nature of the diisocyanate component, the nature and the use of the diol component and to the diols possible as constituents, in order to avoid repetition, reference is made to the statements made in relation to the second preferred variant of hydroxyl-functional polyurethane resins B.

The diisocyanates of the diisocyanate component and the bisphenol A or the diol(s) of the diol component are preferably reacted together in the absence of solvents. With regard to the sequence of addition of the reactants and the reaction conditions, in order to avoid repetition, reference is made to the statements made in relation to the second preferred variant of hydroxyl-functional polyurethane resins B.

Once the reaction carried out in the absence of solvent is complete and the reaction mixture has cooled, solid polyurethane diisocyanates are obtained. When low molar mass diols defined by empirical and structural formula are used for synthesis of the polyurethane diisocyanates, their calculated molar masses are in the range of 625 or above, for example, up to 2300.

The polyurethane diisocyanates assume the form of a mixture exhibiting a molar mass distribution. The polyurethane diisocyanates do not, however, require working up and may be used directly as isocyanate-functional polyurethane resins B.

In a third preferred variant of the second embodiment, the isocyanate-functional polyurethane resins B are polyurethane polyisocyanates which can be prepared by reacting a trimer of a (cyclo)aliphatic diisocyanate, 1,6-hexane diisocyanate and bisphenol A or a diol component in the molar ratio 1:x:x, wherein x means any desired value from 1 to 6, preferably, from 1 to 3, wherein the diol component is one single linear aliphatic alpha,omega-C2-C12-diol or a combination of two to four, preferably, two or three, diols, wherein in the case of a diol combination, each of the diols makes up at least 10 mol % of the diols of the diol combination and the diol combination consists of at least 80 mol % of bisphenol A or of at least one linear aliphatic alpha,omega-C2-C12-diol.

The trimer of the (cyclo)aliphatic diisocyanate, the 1,6-hexane diisocyanate and the bisphenol A or the diol component are reacted stoichiometrically with one another in the molar ratio 1 mol trimer of the (cyclo)aliphatic diisocyanate:x mol 1,6-hexane diisocyanate:x mol diol compound(s), wherein x represents any value from 1 to 6, preferably from 1 to 3.

The trimer of the (cyclo)aliphatic diisocyanate is polyisocyanates of the isocyanurate type, prepared by trimerization of a (cyclo)aliphatic diisocyanate. Appropriate trimerization products derived, for example, from 1,4-cyclohexanedimethylenediisocyanate, in particular, from isophorone diisocyanate and more particularly, from 1,6-hexane diisocyanate, are suitable. The industrially obtainable isocyanurate polyisocyanates generally contain, in addition to the pure trimer, i.e., the isocyanurate made up of three diisocyanate molecules and comprising three NCO functions, isocyanate-functional secondary products with a relatively high molar mass. Products with the highest possible degree of purity are preferably used. In each case, the trimers of the (cyclo)aliphatic diisocyanates obtainable in industrial quality are regarded as pure trimer irrespective of their content of said isocyanate-functional secondary products with respect to the molar ratio of 1 mol trimer of the (cyclo)aliphatic diisocyanate:x mol 1,6-hexane diisocyanate:x mol diol compound(s).

One single linear aliphatic alpha,omega-C2-C12-diol or combinations of two to four, preferably of two or three, diols are used as the diol component.

Examples of one single linear aliphatic alpha,omega-C2-C12-diol or linear aliphatic alpha,omega-C2-C12-diols which can be used within the diol combination are ethylene glycol, 1,3-propanediol, 1,4-butanediol, 1,5-pentanediol, 1,6-hexanediol, 1,10-decanediol, 1,12-dodecanediol.

Examples of (cyclo)aliphatic diols which can be used within the diol combination in addition to the bisphenol A making up at least 80 mol % of the diol combination or the at least one linear aliphatic alpha,omega-C2-C12-diol making up at least 80 mol % of the diol combination are the further isomers of propane and butane diol, different from the isomers of propane and butane diol cited in the preceding paragraph, and neopentylglycol, butylethylpropanediol, the isomeric cyclohexane diols, the isomeric cyclohexanedimethanols, hydrogenated bisphenol A and tricyclodecanedimethanol.

In the case of the diol combination, the mixture of the dihydroxy compounds making up the combination can be used in the synthesis process or the dihydroxy compounds making up the diol combination are each used individually in the synthesis. It is also possible to use a portion of the diols as a mixture and the remaining fraction(s) in the form of pure diol.

In the case of the diol combination, preferred diol combinations totalling 100 mol % in each case are combinations of 10 to 90 mol % 1,3-propanediol with 90 to 10 mol % 1,5-pentanediol, 10 to 90 mol % 1,3-propanediol with 90 to 10 mol % 1,6-hexanediol and 10 to 90 mol % 1,5-pentanediol with 90 to 10 mol % 1,6-hexanediol.

The trimer of the (cyclo)aliphatic diisocyanate, the 1,6-hexane-diisocyanate and the bisphenol A or the diol component are preferably reacted together in the absence of solvents. The reactants may here all be reacted together simultaneously or in two or more synthesis stages. Synthesis procedures in which the bisphenol A or the diol component and the trimer of the (cyclo)aliphatic diisocyanate alone are reacted with one another are preferably avoided.

When the synthesis is performed in multiple stages, the reactants may be added in the most varied order, for example, also in succession or in alternating manner. For example, the 1,6-hexane diisocyanate may be reacted initially with the bisphenol A or with the diol component and then with the trimer of the (cyclo)aliphatic diisocyanate or a mixture of the isocyanate-functional components with the bisphenol A or with the diol component. In the case of a diol combination, the diol component may, for example, also be divided into two or more portions, for example, also into the individual dihydroxy compounds. The individual reactants may in each case be added in their entirety or in two or more portions. The reaction is exothermic and proceeds at a temperature above the melting temperature of the reaction mixture. The reaction temperature is, for example, 60 to 200° C. The rate of addition or quantity of reactants added is accordingly determined on the basis of the degree of exothermy and the liquid (molten) reaction mixture may be maintained within the desired temperature range by heating or cooling.

Once the reaction carried out in the absence of solvents is complete and the reaction mixture has cooled, solid polyurethane polyisocyanates with number average molar masses in the range of 1,500 to 4,000 are obtained. The polyurethane polyisocyanates do not require working up and may be used directly as isocyanate-functional polyurethane resins B.

In a third embodiment the polyurethane resins B are polyurethane resins with blocked isocyanate groups. They may be produced by reacting polyol(s) with polyisocyanate(s) in excess and reacting the excess free isocyanate groups with one or more monofunctional blocking agents. The latent isocyanate content of the polyurethane resins B with blocked isocyanate groups is, for example, in the range from 2 to 21.2 wt. %, calculated as NCO and relative to the corresponding underlying polyurethane resins, i.e., which are free of blocking agent(s).

In a first preferred variant of the third embodiment, the polyurethane resins B have two blocked isocyanate groups per molecule and can be prepared by reacting 1,6-hexane diisocyanate or 4,4'-diphenylmethane diisocyanate with a diol component and with at least one monofunctional blocking agent in the molar ratio x:(x−1):2, wherein x means any desired value from 2 to 6, preferably, from 2 to 4, and the diol component is one single diol, in particular, one single diol with a molar mass in the range of 62 to 600, or a combination of diols, preferably two to four, in particular, two or three diols, wherein, in the case of a diol combination each of the diols preferably constitutes at least 10 mol % of the diols of the diol component.

The diisocyanate, the diol component and the at least one monofunctional blocking agent are reacted stoichiometrically with one another in the molar ratio x mol diisocyanate:(x−1) mol diol compound(s):2 mol blocking agent, wherein x means any desired value from 2 to 6, preferably from 2 to 4.

With regard to the nature and use of the diol component and to the diols possible as constituents, in order to avoid repetition, reference is made to the statements made in relation to the first preferred variant of hydroxyl-functional polyurethane resins B.

Preferably, only one monofunctional blocking agent is used. Examples of the at least one monofunctional blocking agent are the monofunctional compounds known for blocking isocyanate groups, such as, the CH-acidic, NH—, SH— or OH-functional compounds known for this purpose. Examples are CH-acidic compounds, such as, acetylacetone or CH-acidic esters, such as, acetoacetic acid alkyl esters, malonic acid dialkyl esters; aliphatic or cycloaliphatic alcohols, such as, n-butanol, 2-ethylhexanol, cyclohexanol; glycol ethers, such as, butyl glycol, butyl diglycol; phenols; oximes, such as, methyl ethyl ketoxime, acetone oxime, cyclohexanone oxime; lactams, such as, caprolactam; azole blocking agents of the imidazole, pyrazole, triazole or tetrazole type.

The diisocyanate, the diol component and the at least one monofunctional blocking agent are preferably reacted together in the absence of solvents. The reactants may here all be reacted together simultaneously or in two or more synthesis stages. When the synthesis is performed in multiple stages, the reactants may be added in the most varied order, for example, also in succession or in alternating manner. For example, the diisocyanate may be reacted initially with blocking agent and then with the diol(s) of the diol component or initially with the diol(s) of the diol component and then with blocking agent. However, the diol component may, for example, also be divided into two or more portions, for example, also into the individual diols, for example, such that the diisocyanate is reacted initially with part of the diol component before further reaction with blocking agent and finally with the remaining proportion of the diol component. The individual reactants may in each case be added in their entirety or in two or more portions. The reaction is exothermic and proceeds at a temperature above the melting temperature of the reaction mixture. The reaction temperature is, for example, 60 to 200° C. The rate of addition or quantity of reactants added is accordingly determined on the basis of the degree of exothermy and the liquid (molten) reaction mixture may be maintained within the desired temperature range by heating or cooling.

Once the reaction carried out in the absence of solvent is complete and the reaction mixture has cooled, solid polyurethanes with two blocked isocyanate groups per molecule are obtained. When low molar mass diols defined by empirical and structural formula are used for synthesis of the polyurethanes with two blocked isocyanate groups per molecule their molar masses calculated with the example of butanone oxime as the only blocking agent used are in the range of 572 or above, for example, up to 2000.

The polyurethanes with two blocked isocyanate groups per molecule assume the form of a mixture exhibiting a molar mass distribution. The polyurethanes with two blocked isocyanate groups per molecule do not, however, require working up and may be used directly as blocked isocyanate-functional polyurethane resins B.

In a second preferred variant of the third embodiment, the polyurethane resins B have two blocked isocyanate groups per molecule and can be prepared by reacting a diisocyanate component, bisphenol A or a diol component and at least one monofunctional blocking agent in the molar ratio x:(x−1):2, wherein x means any desired value from 2 to 6, preferably, from 2 to 4, wherein 50 to 80 mol % of the diisocyanate component is formed by 1,6-hexane diisocyanate, and 20 to 50 mol % by one or two diisocyanates, each forming at least 10 mol % of the diisocyanate component and being selected from the group consisting of toluylene diisocyanate, diphenylmethane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate, wherein the mol % of the respective diisocyanates add up to 100 mol %, wherein 20 to 100 mol % of the diol component is formed by at least one linear aliphatic alpha,omega-C2-C12-diol, and 0 to 80 mol % by at least one diol that is different from linear aliphatic alpha,omega-C2-C12-diols, wherein each diol of the diol component preferably forms at least 10 mol within the diol component, and wherein the mol % of the respective diols add up to 100 mol %.

The diisocyanate component, the bisphenol A or the diol component and the at least one monofunctional blocking agent are reacted stoichiometrically with one another in the molar ratio x mol diisocyanate:(x−1) mol diol compound(s):2 mol blocking agent, wherein x represents any value from 2 to 6, preferably from 2 to 4.

With regard to the nature of the diisocyanate component, the nature and the use of the diol component and to the diols possible as constituents, in order to avoid repetition, reference is made to the statements made in relation to the second preferred variant of hydroxyl-functional polyurethane resins B.

Preferably, only one monofunctional blocking agent is used. Examples of the at least one monofunctional blocking agent are the same as those listed above as examples in relation to the first preferred variant of polyurethane resins B with blocked isocyanate groups.

The diisocyanate component, the bisphenol A or the diol component and the at least one monofunctional blocking agent are preferably reacted together in the absence of solvents. The reactants may here all be reacted together simultaneously or in two or more synthesis stages. When the synthesis is performed in multiple stages, the reactants may be added in the most varied order, for example, also in succession or in alternating manner. For example, the diisocyanates of the diisocyanate component may be reacted initially with blocking agent and then with the bisphenol A or with the diol(s) of the diol component or initially with the bisphenol A or with the diol component and then with blocking agent. However, the bisphenol A or the diol component may, for example, also be divided into two or more portions, for example, also into the individual diols, for example, such that the diisocyanate component is reacted initially with part of the bisphenol A or of the diol component before further reaction with blocking agent and finally with the remaining proportion of the bisphenol A or of the diol component. In a very similar manner, however, the diisocyanate component may, for example, also be divided into two or more portions, for example, also into the individual diisocyanates, for example, such that the bisphenol A or the diol component and blocking agent are reacted initially with part of the diisocyanate component and finally with the remaining proportion of the diisocyanate component. The individual reactants may in each case be added in their entirety or in two or more portions. The reaction is exothermic and proceeds at a temperature above the melting temperature of the reaction mixture. The reaction temperature is, for example, 60 to 200° C. The rate of addition or quantity of reactants added is accordingly determined on the basis of the degree of exothermy and the liquid (molten) reaction mixture may be maintained within the desired temperature range by heating or cooling.

Once the reaction carried out in the absence of solvent is complete and the reaction mixture has cooled, solid polyurethanes with two blocked isocyanate groups per molecule are obtained. When low molar mass diols defined by empirical and structural formula are used for synthesis of the polyurethanes with two blocked isocyanate groups per molecule, their molar masses calculated with the example of butanone oxime as the only blocking agent used are in the range of 570 or above, for example, up to 2000.

The polyurethanes with two blocked isocyanate groups per molecule assume the form of a mixture exhibiting a molar mass distribution. The polyurethanes with two blocked isocyanate groups per molecule do not, however, require working up and may be used directly as blocked isocyanate-functional polyurethane resins B.

In a third preferred variant of the third embodiment, the polyurethane resins B are polyurethanes with blocked isocyanate groups and can be prepared by reacting a trimer of a (cyclo)aliphatic diisocyanate, 1,6-hexane diisocyanate, bisphenol A or a diol component and at least one monofunctional blocking agent in the molar ratio 1:x:x:3, wherein x means any desired value from 1 to 6, preferably, from 1 to 3, wherein the diol component is one single linear aliphatic alpha,omega-C2-C12-diol or a combination of two to four, preferably, two or three, diols, wherein in the case of diol combination, each of the diols makes up at least 10 mol % of the diols of the diol combination and the diol combination consists of at least 80 mol % of bisphenol A or of at least one linear aliphatic alpha,omega-C2-C12-diol.

The trimer of the (cyclo)aliphatic diisocyanate, the 1,6-hexane diisocyanate, the bisphenol A or the diol component and the at least one monofunctional blocking agent are reacted stoichiometrically with one another in the molar ratio 1 mol trimer of the (cyclo)aliphatic diisocyanate:x mol 1,6-hexane diisocyanate:x mol diol compound(s):3 mol blocking agent, wherein x represents any value from 1 to 6, preferably from 1 to 3.

With regard to the nature of the trimer of the (cyclo)aliphatic diisocyanate, the nature and the use of the diol component and to the diols possible as constituents, in order to avoid repetition, reference is made to the statements made in relation to the third preferred variant of isocyanate-functional polyurethane resins B.

Preferably, only one monofunctional blocking agent is used. Examples of the at least one monofunctional blocking agent are the same as those listed above as examples in relation to the first preferred variant of polyurethane resins B with blocked isocyanate groups.

The trimer of the (cyclo)aliphatic diisocyanate, the 1,6-hexane diisocyanate, the bisphenol A or the diol component and the at least one monofunctional blocking agent are preferably reacted together in the absence of solvents. The reactants may here all be reacted together simultaneously or in two or more synthesis stages. Synthesis procedures in which the blocking agent or the bisphenol A or the diol component and the trimer of the (cyclo)aliphatic diisocyanate alone are reacted with one another are preferably avoided.

When the synthesis is performed in multiple stages, the reactants may be added in the most varied order, for example, also in succession or in alternating manner. For example, the 1,6-hexane diisocyanate may be reacted initially with a mixture of the bisphenol A or of the diol component and the blocking agent and then with the trimer of the (cyclo)aliphatic diisocyanate or a mixture of the isocyanate-functional components with the bisphenol A or the diol component and the blocking agent or a mixture of the isocyanate-functional components may be reacted initially with blocking agent and then with the bisphenol A or the diol component. In the case of a diol combination, the diol component may, for example, also be divided into two or more portions, for example, also into the individual dihydroxy compounds. The individual reactants may in each case be added in their entirety or in two or more portions. The reaction is exothermic and proceeds at a temperature above the melting temperature of the reaction mixture. The reaction temperature is, for example, 60 to 200° C. The rate of addition or quantity of reactants added is accordingly determined on the basis of the degree of exothermy and the liquid (molten) reaction mixture may be maintained within the desired temperature range by heating or cooling.

Once the reaction carried out in the absence of solvents is complete and the reaction mixture has cooled, solid polyurethanes with blocked isocyanate groups and with number average molar masses in the range of 1,500 to 4,000 are obtained. The polyurethanes with blocked isocyanate groups do not require working up and may be used directly as blocked isocyanate-functional polyurethane resins B.

In the liquid coating compositions of the present invention at least one polyurethane resin B is present in particulate form, and preferably, in the form of particles with a non-spherical shape. In case of non-aqueous coating compositions the polyurethane resin B particles may be combined in any suitable manner, for example, either by stirring or mixing as a ground powder, into the liquid coating composition or into liquid constituents thereof, wherein it is possible subsequently to perform additional wet grinding or dispersing of the polyurethane resin B particles. The subsequent grinding or dispersing may be done, for example, by means of a bead mill, in the resultant suspension. In case of aqueous coating compositions, the polyurethane resin B particles are, in particular, present within the generally aqueously dispersed binder(s) A phase or binder(s) A containing phase respectively. Here it is preferred to stir or mix the polyurethane resin B particles as a ground powder into the water-dilutable binder(s) A not yet converted into the aqueous phase, wherein it is possible subsequently to perform additional wet grinding or dispersing of the polyurethane resin B particles, for example, by means of a bead mill, in the resultant suspension which thereafter is converted into the aqueous phase by dilution with water. The average particle size (mean particle diameter) of the polyurethane resin B particles determined by means of laser diffraction is, for example, 1 to 100 µm. The polyurethane resin B particles in the form of a ground powder may be formed by grinding (milling) of the solid polyurethane resin(s) B; for example, conventional powder coat production technology may be used for that purpose.

A further method for forming the polyurethane resin B particles involves hot dissolution of the at least one polyurethane resin B in a dissolution medium and subsequent polyurethane resin B particle formation during and/or after cooling. This method can be used in case of non-aqueous coating compositions. Dissolution of the at least one polyurethane resin B may be performed in particular in a proportion or the entirety of the non-aqueous binder(s) A or the cross-linker(s) C with heating, for example, to the melting temperature or above, for example, to temperatures of 40 to above 200° C., whereupon the polyurethane resin B particles may form during and/or after the subsequent cooling. The non-aqueous binder A or cross-linker C used as dissolution medium for the at least one polyurethane resin B may here be present liquid as such or as a solution in an organic solvent (mixture). Thorough mixing or stirring is preferably performed during cooling. Dissolution of the at least one polyurethane resin B may also be performed with heating in an organic solvent (mixture), wherein the formation of the polyurethane resin B particles, which proceeds during and/or after the subsequent cooling, may proceed in the solvent itself. Here it is also possible to allow the formation of the polyurethane resin B particles after mixing of the resultant, as yet uncooled solution with the binder(s) A or cross-linker(s) C. It must be ensured that the dissolution operation of polyurethane resin B is performed under conditions which do not permit any chemical reaction between the polyurethane resin B and the dissolution medium, i.e., it is, for example, possible to dissolve a hydroxyl-functional polyurethane resin B in a hydroxyl-functional binder A or an isocyanate-functional polyurethane resin B in a polyisocyanate crosslinking agent C with heating. It is, however, in particular not possible to dissolve an isocyanate-functional polyurethane resin B in a hydroxyl-functional binder A or in a hydroxyl-functional organic solvent with heating. In the case of polyurethane resins B with blocked isocyanate groups, dissolution in a hydroxyl-functional binder A with heating is only possible up to temperatures which do not permit the blocked isocyanate groups to dissociate back into free isocyanate groups and blocking agent.

In case of aqueous coating compositions it is possible to apply the method of hot dissolution of the at least one polyurethane resin B and subsequent polyurethane resin B particle formation during and/or after cooling as well. Here, the at least one polyurethane resin B is preferably present in the presence of the water-dilutable binder(s) A not yet converted into the aqueous phase and is converted with these into the aqueous phase—optionally, after the addition of neutralizing agent, unless this has already been done—by dilution with water. Here, polyurethane resin B particle formation may happen prior to and/or after dilution with water; in any case however, polyurethane resin B particle formation happens within the binder(s) A phase or the binder(s) A containing phase respectively. The same limitations apply as described in the preceding paragraph, i.e., care must be taken in this case too to ensure that the dissolution operation of the at least one polyurethane resin B is performed under conditions which do not permit any chemical reaction between the polyurethane resin(s) B and the water-dilutable binder(s) A used as dissolution medium.

By using the method of hot dissolution and subsequent polyurethane resin B particle formation during and/or after cooling, it is in particular possible to produce polyurethane resin B particles with average particle sizes at the lower end of the range of average particle sizes, for example, in the range of 1 to 50 µm, in particular 1 to 30 µm.

The coating compositions contain at least one cross-linker C for the at least one binder A. Examples of type C cross-linkers are conventional cross-linking agents known to the person skilled in the art for coating systems based on hydroxyl-functional binders, such as, for example, transesterification cross-linking agents; amino resin cross-linking agents, such as, melamine-formaldehyde resins; free or blocked polyisocyanate cross-linking agents; and/or tris-alkoxycarbonylaminotriazine cross-linking agents.

The coating compositions may contain one or more components D which contribute towards the resin solids content. The term "components D" encompasses components free of hydroxyl groups and also free of groups capable of cross-linking with hydroxyl groups. These comprise in particular corresponding resins. Examples of type D resins are physically drying resins or resins which may be chemically cured by reactions other than cross-linking reactions involving hydroxyl groups.

One, some or each of components A, C and D may contain free-radically polymerizable olefinic double bonds. The coating compositions may then be cured not only by cross-linking reactions involving hydroxyl groups, but additionally by free-radical polymerization of the olefinic double bonds, in particular, by photochemically induced free-radical polymerization. Such compositions are also known as "dual-cure" coating compositions.

The coating compositions contain water and/or organic solvent(s) and they have a solids content of, for example, 35 to 85 wt. %, preferably, 40 to 75 wt. %. In case of non-aqueous coating compositions the organic solvent content is, for example, 15 to 60 wt. %, preferably, 25 to 55 wt. %; the sum of the wt.-% of the solids content and the organic solvent content is here, for example, 90 to 100 wt.-% (any possible difference in the corresponding range of above 0 to 10 wt.-% to make up to the total of 100 wt. % is in general formed by volatile additives). In case of aqueous coating compositions the organic solvent content is, for example, 0 to 20 wt. %. The organic solvents are in particular conventional coating solvents, for example, glycol ethers, such as, butyl glycol, butyl diglycol, dipropylene glycol dimethyl ether, dipropylene glycol monomethyl ether, ethylene glycol dimethylether; glycol ether esters, such as, ethyl glycol acetate, butyl glycol acetate, butyl diglycol acetate, methoxypropyl acetate; esters, such as, butyl acetate, isobutyl acetate, amyl acetate; ketones, such as, methyl ethyl ketone, methyl isobutyl ketone, diisobutyl ketone, cyclohexanone, isophorone; alcohols, such as, methanol, ethanol, (iso)propanol, butanol; N-alkyl pyrrolidones, such as, N-methyl pyrrolidone; aromatic hydrocarbons, such as, xylene, Solvesso® 100 (mixture of aromatic hydrocarbons with a boiling range from 155° C. to 185° C.), Solvesso® 150 (mixture of aromatic hydrocarbons with a boiling range from 182° C. to 202° C.) and aliphatic hydrocarbons.

The coating compositions may also contain additional components that are conventional coating additives. These include, for example, emulsifiers, neutralizing agents, inhibitors, catalysts, levelling agents, wetting agents, anticratering agents, antioxidants and/or light stabilizers. The additives are used in conventional amounts known to the person skilled in the art. In case of dual cure coating compositions, generally used photoinitiators are contained therein.

The coating compositions may also contain transparent pigments, color-imparting and/or special effect-imparting pigments and/or fillers, for example, corresponding to a ratio by weight of pigment plus filler:resin solids content in the range from 0:1 to 2:1. Suitable color-imparting pigments are any conventional coating pigments of an organic or inorganic nature. Examples of inorganic or organic color-imparting pigments are titanium dioxide, iron oxide pigments, carbon black, azo pigments, phthalocyanine pigments, quinacridone pigments and pyrrolopyrrole pigments. Examples of special effect pigments are metal pigments, for example, of aluminum, copper or other metals, interference pigments, such as, for example, metal oxide-coated metal pigments, for example, iron oxide-coated aluminum, coated mica, such as, for example, titanium dioxide-coated mica, graphite effect-imparting pigments, iron oxide in flake form, liquid crystal pigments, coated aluminum oxide pigments, and coated silicon dioxide pigments. Examples of fillers are silicon dioxide, aluminum silicate, barium sulfate, calcium carbonate and talc.

The coating compositions may be used for the production of single-layer coatings or for the production of one or more coating layers within a multilayer coating, such as, in particular, an automotive multilayer coating, either on an automotive body or on an automotive body part. This may relate to both original and repair coating applications. The coating compositions may in particular be used in pigmented form for the production of a primer surfacer layer or in pigment-free form for the production of an outer clear top coat layer or a transparent sealing layer of a multilayer coating. They may, for example, be used for the production of a clear top coat layer on a previously applied color-imparting and/or special effect-imparting predried base coat layer.

The coating compositions may be applied by means of conventional application methods, in particular, by spraying onto any desired uncoated or precoated substrates, for example, of metal or plastics.

Once applied, layers of the coating compositions may initially be flashed off to remove solvent and/or water, for example, for one to five minutes at 20 to 80° C. Thermal curing then proceeds at object temperatures above the melting temperature of the at least one polyurethane resin B contained in the corresponding coating composition, for example, for 5 to 30 minutes at 40 to 220° C., preferably, 80 to 190° C., for example, by baking. If the difference between the melting temperature and the actual curing temperature is sufficiently large, it is possible initially to effect only or substantially only the melting of the polyurethane resin B particles, before the actual cross-linking subsequently proceeds during and/or after a further increase in temperature to the curing temperature. During and/or after melting the polyurethane resin B particles the polyurethane resin B may become incorporated into the resin matrix.

If the coating compositions according to the invention are dual-cure coating compositions, thermal curing is combined with curing by free-radical polymerization of olefinic double bonds induced by irradiation with high-energy radiation, in particular, UV radiation. Thermal curing and radiation curing may here proceed simultaneously or in any desired order. Melting of the polyurethane resin B particles must, however, be ensured prior to curing.

EXAMPLES

Examples 1a to 1d

Preparation of Polyurethane Diols

Polyurethane diols were produced by reacting HDI (1,6-hexane diisocyanate) or a mixture of HDI and DCMDI (dicyclohexylmethane diisocyanate) with one or more diols in accordance with the following general synthesis method:

One diol or a mixture of diols was initially introduced into a 2 litre four-necked flask equipped with a stirrer, thermometer and column and 0.01 wt. % dibutyltin dilaurate, relative to the initially introduced quantity of diol(s), were added. The mixture was heated to 80° C. HDI or a HDI/DCMDI mixture was then apportioned and a temperature was maintained so that the hot reaction mixture did not solidify. The reaction mixture was stirred until no free isocyanate could be detected (NCO content <0.1%). The hot melt was then discharged and allowed to cool and solidify.

The melting behavior of the resultant polyurethane diols was investigated by means of DSC (differential scanning calorimetry, heating rate 10 K/min).

Examples 1a to 1d are shown in Table 1. The Table states which reactants were reacted together in what molar ratios and the final temperature of the melting process measured by DSC is stated in ° C.

TABLE 1

| Example | Mols HDI | Mols DCMDI | Mols diol A | Mols diol B | Mols diol C | FT |
|---|---|---|---|---|---|---|
| 1a | 2 | | 2 PROP | 1 HEX | | 131° C. |
| 1b | 2 | | 2 PENT | | | 137° C. |
| 1c | 3 | | 1.33 PENT | 1.33 PROP | 1.33 HEX | 118° C. |
| 1d | 1.5 | 0.5 | 1 PENT | 1 PROP | 1 HEX | 105° C. |

FT: Final temperature of the melting process
HEX: 1,6-hexanediol
PENT: 1,5-pentanediol
PROP: 1,3-propanediol Examples 2a to 2c Preparation of Polyurethane Polyols Polyurethane polyols were produced by reacting HDI or a mixture of HDI and DCMDI with a mixture of GLY (glycerol) and one or more diols in accordance with the following general synthesis method:

The polyols were initially introduced into a 2 litre four-necked flask equipped with a stirrer, thermometer and column and 0.01 wt. % dibutyltin dilaurate, relative to the initially introduced quantity of polyols, were added. The mixture was heated to 80° C. HDI or a HDI/DCMDI mixture was then apportioned and a temperature was maintained so that the hot reaction mixture did not solidify. The reaction mixture was stirred until no free isocyanate could be detected (NCO content <0.1%). The hot melt was then discharged and allowed to cool and solidify.

The melting behavior of the resultant polyurethane polyols was investigated by means of DSC (differential scanning calorimetry, heating rate 10 K/min).

Examples 2a to 2c are shown in Table 2. The Table states which reactants were reacted together in what molar ratios and the final temperature of the melting process measured by DSC is stated in ° C.

TABLE 2

| Example | Mols HDI | Mols DCMDI | Mols GLY | Mols diol A | Mols diol B | FT |
|---|---|---|---|---|---|---|
| 2a | 2 | | 2 | 1 HEX | | 104° C. |
| 2b | 2 | | 1 | 1 HEX | 1 PENT | 101° C. |
| 2c | 1.5 | 0.5 | 1 | 2 HEX | | 117° C. |

Examples 3a to 3c

Preparation of Polyurethanes with Two Blocked Isocyanate Groups

Polyurethanes with two blocked isocyanate groups were produced by reacting HDI with diols and butanone oxime in accordance with the following general synthesis method:

HDI was initially introduced into a 2 litre four-necked flask equipped with a stirrer, thermometer and column and 0.01 wt. % dibutyltin dilaurate, relative to the initially introduced quantity of HDI, were added. The reaction mixture was heated to 60° C. Butanone oxime was then apportioned in such a manner that the temperature did not exceed 80° C. The reaction mixture was stirred at 80° C. until the theoretical NCO content had been reached. Once the theoretical NCO content had been reached, the diols A and B were added one after the other, in each case in a manner such that a temperature of 140° C. was not exceeded. In each case, the subsequent diol was not added until the theoretical NCO content had been reached. The reaction mixture was stirred at a maximum of 140° C. until no free isocyanate could be detected. The hot melt was then discharged and allowed to cool and solidify.

The melting behavior of the resultant polyurethanes with two blocked isocyanate groups was investigated by means of DSC (differential scanning calorimetry, heating rate 10 K/min).

Examples 3a to 3c are shown in Table 3. The Table states which reactants were reacted together in what molar ratios and the final temperature of the melting process measured by DSC is stated in ° C.

TABLE 3

| Example | Mols HDI | Mols butanone oxime | Mols diol A | Mols diol B | FT |
|---|---|---|---|---|---|
| 3a | 3 | 2 | 1 PROP | 1 HEX | 125° C. |
| 3b | 3 | 2 | 2 PENT | | 127° C. |
| 3c | 3 | 2 | 1 PENT | 1 HEX | 114° C. |

Examples 4a and 4b

Preparation of Polyurethanes with Blocked Isocyanate Groups

Polyurethanes with blocked isocyanate groups were produced by reacting t-HDI (trimeric hexanediisocyanate; Desmodur® N3600 from Bayer), HDI, a diol component and butanone oxime in accordance with the following general synthesis method:

A mixture of t-HDI and HDI was initially introduced into a 2 litre four-necked flask equipped with a stirrer, thermometer and column and 0.01% by weight dibutyl tin dilaurate, based on the quantity of isocyanate introduced, were added. The reaction mixture was heated to 60° C. A mixture of butanone oxime and diol was then added such that 140° C. was not exceeded. The temperature was carefully increased to a maximum of 140° C. and the mixture stirred until no more free isocyanate could be detected. The hot melt was then discharged and allowed to cool and solidify.

The melting behavior of the resultant polyurethanes with blocked isocyanate groups was investigated by means of DSC (heating rate 10 K/min).

Examples 4a and 4b are shown in Table 4. The table states which reactants were reacted together and in which molar ratios and the final temperature of the melting process measured using DSC is indicated in ° C.

TABLE 4

| Example | Mols t-HDI | Mols HDI | Mols butanone oxime | Mols diol | FT |
|---|---|---|---|---|---|
| 4a | 1 | 3 | 3 | 3 PROP | 112° C. |
| 4b | 1 | 2 | 3 | 2 HEX | 118° C. |

Example 5

Preparation of a Polyurethane Diisocyanate

A polyurethane diisocyanate was produced by reacting HDI with PENT and HEX in a 3:1:1 molar ratio. The HDI was initially introduced into a 2 litre four-necked flask equipped with a stirrer, thermometer and column and 0.01 wt. % dibutyltin dilaurate, based on the quantity of isocyanate introduced, were added. The content of the flask was heated to 60° C. The diol mixture was then apportioned and a temperature was maintained so that the hot reaction mixture did not solidify. The reaction mixture was stirred until the theoretical free isocyanate content was reached. The hot melt was then discharged and allowed to cool and solidify.

The melting behavior of the resultant polyurethane diisocyanate was investigated by means of DSC (differential scanning calorimetry, heating rate 10 K/min). The final temperature of the melting process measured by DSC was 108 ° C.

Example 6

Preparation of a Polyurethane Polyisocyanate

A polyurethane polyisocyanate was produced by reacting t-HDI, HDI and PENT in a 1:3:3 molar ratio. A mixture of the t-HDI and the HDI was initially introduced into a 2 litre four-necked flask equipped with a stirrer, thermometer and column and 0.1% by weight dibutyl tin dilaurate, based on the quantity of isocyanate introduced, were added. The reaction mixture was heated to 60° C. The PENT was then apportioned and a temperature was maintained so that the hot reaction mixture did not solidify. The reaction mixture was stirred until the theoretical free isocyanate content was reached. The hot melt was then discharged and allowed to cool and solidify.

The melting behavior of the resultant polyurethane polyisocyanate was investigated by means of DSC (differential scanning calorimetry, heating rate 10 K/min). The final temperature of the melting process measured by DSC was 99 ° C.

Example 7

Production of a Clear Coat Composition and an Outer Clear Coat Layer of a Multi-Layer Coating for Comparison Purposes A base was prepared by mixing the following components:
61.6 parts of a 65 wt-% solution of a methacrylic copolymer (acid value 5 mg KOH/g, hydroxyl value 147 mg KOH/g) in a 2:1 mixture of Solvesso® 100 and butyl acetate
6.7 parts of a 65 wt-% solution of a branched polyester (acid value 41 mg KOH/g, hydroxyl value 198 mg KOH/g, number-average molecular mass 1000) in Solvesso® 100
5.3 parts of ethoxypropyl acetate
6.8 parts of Solvesso® 150
1.2 parts of Tinuvin® 292 from Ciba (light protecting agent)
1.2 parts of Tinuvin® 384 from Ciba (UV-absorber)
2.0 parts of butyl acetate
4.3 parts of butyl diglycol acetate
4.4 parts of butyl glycol acetate
6.5 parts of Solvesso® 100

A clear coat was prepared by mixing 100 pbw (parts by weight) of the base with 50 parts of a 68 wt-% solution of a polyisocyanate hardener mixture (isocyanurate of isophorone diisocyanate and isocyanurate of hexamethylene diisocyanate in a weight ratio of 2:1) in a 2:1 mixture of Solvesso® 100 and butyl acetate.

A metal panel provided with a cataphoretic primer and a 35 μm thick hydroprimer surfacer layer applied thereto and baked was spray-coated with a black waterborne base coat in a dry layer thickness of 15 μm, flashed off for 5 minutes at 70° C. and then spray-coated with the clear coat in a vertical position in a wedge shape with a layer thickness gradient from 10 μm to 70 μm dry layer thickness, and after 10 minutes flashing off at room temperature, baking was carried out for 30 minutes at 130° C. (object temperature). The clear coat sag limit was visually determined.

Examples 8a to 8g

Production of Clear Coat Compositions and Outer Clear Coat Layers of Multi-Layer Coatings According to the Invention Solid polyurethane diols of Examples 1a to 1d and solid polyurethane polyols of Examples 2a to 2c were in each case comminuted, ground and sieved by means of grinding and sieving methods conventional for the production of powder coatings and, in this manner, converted into binder powders with an average particle size of 50 μm (determined by means of laser diffraction).

Example 7 was repeated several times with the difference that 1.2 parts of a pulverulent polyurethane prepared according to the procedure described in the preceding paragraph were first of all added to the solution of the branched polyester. Thereafter the polyurethane was dissolved by heating the stirred mixture above the melting point of the respective polyurethane. After hot dissolution of the polyurethane the mixture was stirred and allowed to cool. After cooling the polyurethane solidified finely dispersed in the mixture. Thereafter the clear coat was prepared according to the procedure of Example 7 using the solution of the branched polyester comprising the finely dispersed polyurethane particles instead of the solution of the branched polyester used in Example 7.

The sag limit was determined under the same conditions as in Example 7.

Table 5 shows the measured sag limit in μm, with reference to Examples 7 and 8a to 8g.

TABLE 5

| Examples (OH-funct. polyurethane powder used) | | | | | | | |
|---|---|---|---|---|---|---|---|
| 7 (./.) | 8a (1a) | 8b (1b) | 8c (1c) | 8d (1d) | 8e (2a) | 8f (2b) | 8g (2c) |
| Sag limit (μm) 33 | 37 | 38 | 36 | 37 | 37 | 36 | 36 |

Examples 9a to 9e

Production of Clear Coat Compositions and Outer Clear Coat Layers of Multi-Layer Coatings According to the Invention Solid polyurethanes of Examples 3a to 3c, 4a and 4b were in each case comminuted, ground and sieved by means of grinding and sieving methods conventional for the production of powder coatings and, in this manner, converted into binder powders with an average particle size of 50 μm (determined by means of laser diffraction).

Example 7 was repeated several times wherein 1.2 parts of a pulverulent polyurethane prepared according to the procedure described in the preceding paragraph were added to the base and stirred in.

The sag limit was determined under the same conditions as in Example 7.

Table 6 shows the measured sag limit in μm, with reference to Examples 7 and 9a to 9e.

TABLE 6

| Examples (polyurethane powder used) | | | | | |
|---|---|---|---|---|---|
| 7 (./.) | 9a (3a) | 9b (3b) | 9c (3c) | 9d (4a) | 9e (4b) |
| Sag limit (μm) 33 | 35 | 34 | 35 | 34 | 35 |

Examples 10a and 10b

Production of Clear Coat Compositions and Outer Clear Coat Layers of Multi-Layer Coatings According to the Invention Solid polyurethanes of Examples 5 and 6 were in each case comminuted, ground and sieved by means of grinding and sieving methods conventional for the production of powder coatings and, in this manner, converted into binder powders with an average particle size of 50 μm (determined by means of laser diffraction).

Example 7 was repeated two times with the difference that 1.2 parts of a pulverulent polyurethane prepared according to the procedure described in the preceding paragraph were first of all added to the solution of the polyisocyanate hardener mixture. Thereafter the polyurethane was dissolved by heating the stirred mixture above the melting point of the respective polyurethane. After hot dissolution of the polyurethane the mixture was stirred and allowed to cool. After cooling the polyurethane solidified finely dispersed in the mixture. Thereafter the clear coat was prepared according to the procedure of Example 7 using the solution of the polyisocyanate hardener mixture comprising the finely dispersed polyurethane particles instead of the solution of the polyisocyanate hardener mixture used in Example 7.

The sag limit was determined under the same conditions as in Example 7.

Table 7 shows the measured sag limit in μm, with reference to Examples 7, 10a and 10b.

TABLE 7

| Examples (polyurethane powder used) | 7 (./.) | 10a (5) | 10b (6) |
|---|---|---|---|
| Sag limit (μm) | 33 | 35 | 36 |

Example 11

Production of a Clear Coat Composition and an Outer Clear Coat Layer of a Multi-Layer Coating for Comparison Purposes A clear coat was prepared by mixing the following components:
53.3 parts of a 65 wt-% solution of a methacrylic copolymer (acid value 20 mg KOH/g, hydroxyl value 119 mg KOH/g) in a 4:1 mixture of Solvesso®100 and butanol
28.0 parts of Luwipal® 018 from BASF (melamine resin)
11.8 parts of Solvesso® 150
0.9 parts of Tinuvin® 1130 from Ciba (UV absorber)
0.9 parts of Tinuvin® 144 from Ciba (light protecting agent)
0.9 parts of Nacure® 5225 from King (catalyst)
4.2 parts of Solvesso® 100

Application of the clear coat and determination of its sag limit was performed under the same conditions as described in Example 7.

Examples 12a to 12g

Production of Clear Coat Compositions and Outer Clear Coat Layers of Multi-Layer Coatings According to the Invention Example 11 was repeated several times with the difference that 0.9 parts of a pulverulent polyurethane prepared as described in Examples 8a to 8g were first of all added to the solution of the methacrylic copolymer. Thereafter the polyurethane was dissolved by heating the stirred mixture above the melting point of the respective polyurethane. After hot dissolution of the polyurethane the mixture was stirred and allowed to cool. After cooling the polyurethane solidified finely dispersed in the mixture. Thereafter the clear coat was prepared according to the procedure of Example 7 using the solution of the methacrylic copolymer comprising the finely dispersed polyurethane particles instead of the solution of the methacrylic copolymer used in Example 7.

The sag limit was determined under the same conditions as in Example 7.

Table 8 shows the measured sag limit in μm, with reference to Examples 11 and 12a to 12g.

TABLE 8

| | Examples (OH-funct. polyurethane powder used) | | | | | | | |
|---|---|---|---|---|---|---|---|---|
| | 11 (./.) | 12a (1a) | 12b (1b) | 12c (1c) | 12d (1d) | 12e (2a) | 12f (2b) | 12g (2c) |
| Sag limit (μm) | 29 | 35 | 34 | 34 | 36 | 34 | 35 | 34 |

Examples 13a to 13e

Production of Clear Coat Compositions and Outer Clear Coat Layers of Multi-Layer Coatings According to the Invention Example 11 was repeated several times wherein 0.9 parts of a pulverulent polyurethane prepared as described in Examples 9a to 9e were added to the clear coat and stirred in.

The sag limit was determined under the same conditions as in Example 7.

Table 9 shows the measured sag limit in μm, with reference to Examples 11 and 13a to 13e.

TABLE 9

| | Examples (polyurethane powder used) | | | | | |
|---|---|---|---|---|---|---|
| | 11 (./.) | 13a (3a) | 13b (3b) | 13c (3c) | 13d (4a) | 13e (4b) |
| Sag limit (μm) | 29 | 31 | 31 | 32 | 33 | 31 |

What is claimed is:

1. A liquid coating composition comprising a resin solids content comprising (i) a binder solids content comprising at least one hydroxyl-functional binder A and 0.5 to less than 5 wt.%, based on the binder solids content, of at least one polyurethane resin B with functional groups selected from the group consisting of hydroxyl groups, free isocyanate groups and blocked isocyanate groups and (ii) at least one cross-linker C, wherein the at least one polyurethane resin B is present as particles having a melting temperature of 40 to 200° C.

2. The coating compositions of claim 1 containing water and/or organic solvent(s) and optionally, further comprising pigments, fillers and non-volatile additives; and wherein the coating composition has a solids content of 35 to 85 wt.%., wherein the solids content comprises the resin solids content and the optional components: pigments, fillers and non-volatile additives, if present.

3. The coating composition of claim 1, wherein the solubility of the at least one polyurethane resin B is less than 10 g per litre of butyl acetate or water at 20° C.

4. The coating composition of claim 1, wherein the average particle size of the polyurethane resin B particles determined by means of laser diffraction is 1 to 100 μm.

5. The coating composition of claim 1, wherein the polyurethane resin B particles have a non-spherical shape.

6. The coating composition of claim 1, wherein the polyurethane resin B particles are formed by grinding of the at least one solid polyurethane resin B or by hot dissolution of the at least one polyurethane resin B in a dissolution medium and subsequent polyurethane resin B particle formation during and/or after cooling.

7. The coating composition of claim 1, wherein the at least one polyurethane resin B is a hydroxyl-functional polyurethane resin in the form of a polyurethane diol which can be prepared by reacting 1,6-hexane diisocyanate or 4,4'-diphenylmethane diisocyanate with a diol component in the molar ratio x : (x+1), wherein x means any desired value from 2 to 6, and the diol component is one single diol or a combination of diols.

8. The coating composition of claim 1, wherein the at least one polyurethane resin B is a hydroxyl-functional polyurethane resin in the form of a polyurethane diol which can be prepared by reacting a diisocyanate component with a diol component in the molar ratio x:( x+1), wherein x means any desired value from 2 to 6, wherein 50 to 80 mol % of the diisocyanate component is formed by 1,6-hexane diisocyanate, and 20 to 50 mol % by one or two diisocyanates, each forming at least 10 mol % of the diisocyanate component and being selected from the group consisting of toluylene diisocyanate, diphenylmethane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate, wherein the mol % of the respective diisocyanates add up to 100 mol %, wherein 20 to 100 mol % of the diol component is formed by at least one linear aliphatic alpha,omega-C2-C12-diol, and 0 to 80 mol % by at least one diol that is different from the linear aliphatic alpha,omega-C2-C12-diols, wherein the mol % of the respective diols add up to 100 mol %.

9. The coating composition of claim 1, wherein the at least one polyurethane resin B is an isocyanate-functional polyurethane resin in the form of a polyurethane diisocyanate which can be prepared by reacting 1,6-hexane diisocyanate or 4,4'-diphenylmethane diisocyanate with a diol component in the molar ratio (x+1) : x, wherein x means any desired value from 2 to 6, and the diol component is one single diol or a combination of diols.

10. The coating composition of claim 1, wherein the at least one polyurethane resin B is an isocyanate-functional polyurethane resin in the form of a polyurethane diisocyanate which can be prepared by reacting a diisocyanate component and bisphenol A or a diol component in the molar ratio (x+1) : x, wherein x means any desired value from 2 to 6, wherein 50 to 80mol % of the diisocyanate component is formed by 1,6-hexane diisocyanate, and 20 to 50 mol % by one or two diisocyanates, each forming at least 10 mol % of the diisocyanate component and being selected from the group consisting of toluylene diisocyanate, diphenylmethane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate, wherein the mol % of the respective diisocyanates add up to 100 mol %, wherein 20 to 100 mol % of the diol component is formed by at least one linear aliphatic alpha,omega-C2-C12-diol, and 0 to 80 mol % by at least one diol that is different from the linear aliphatic alpha,omega-C2-C12-diols, wherein the mol % of the respective diols add up to 100 mol %.

11. The coating composition of claim 1, wherein the at least one polyurethane resin B is an isocyanate-functional polyurethane resin in the form of a polyurethane polyisocyanate which can be prepared by reacting a trimer of a (cyclo)aliphatic diisocyanate, 1,6-hexane diisocyanate and bisphenol A or a diol component in the molar ratio 1 : x : x, wherein x means any desired value from 1 to 6, wherein the diol component is one single linear aliphatic alpha,omega-C2-C12-diol or a combination of two diols, wherein in the case of a diol combination, each of the diols makes up at least 10 mol % of the diols of the diol combination and the diol combination consists of at least 80 mol % of bisphenol A or of at least one linear aliphatic alpha,omega-C2-C12-diol.

12. The coating composition of claim 1, wherein the at least one polyurethane resin B is a polyurethane resin with two blocked isocyanate groups per molecule which can be prepared by reacting 1,6-hexane diisocyanate or 4,4'-diphenylmethane diisocyanate with a diol component and with at least one monofunctional blocking agent in the molar ratio x : (x+1) : 2, wherein x means any desired value from 2 to 6, and the diol component is one single diol or a combination of diols.

13. The coating composition of claim 1, wherein the at least one polyurethane resin B is a polyurethane resin with two blocked isocyanate groups per molecule which can be prepared by reacting a diisocyanate component, bisphenol A or a diol component and at least one monofunctional blocking agent in the molar ratio x : (x+1) : 2, wherein x means any desired value from 2 to 6, wherein 50 to 80 mol % of the diisocyanate component is formed by 1,6-hexane diisocyanate, and 20 to 50 mol % by one or two diisocyanates, each forming at least 10 mol % of the diisocyanate component and being selected from the group consisting of toluylene diisocyanate, diphenylmethane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate, wherein the mol % of the respective diisocyanates add up to 100 mol %, wherein 20 to 100 mol % of the diol component is formed by at least one linear aliphatic alpha,omega-C2-C12-diol, and 0 to 80 mol % by at least one diol that is different from linear aliphatic alpha,omega-C2-C12-diols, wherein the mol % of the respective diols add up to 100 mol %.

14. The coating composition of claim 1, wherein the at least one polyurethane resin B is a polyurethane resin with blocked isocyanate groups which can be prepared by reacting a trimer of a (cyclo)aliphatic diisocyanate, 1,6-hexane diisocyanate, bisphenol A or a diol component and at least one monofunctional blocking agent in the molar ratio 1 : x : x : 3, wherein x means any desired value from 1 to 6, wherein the diol component is one single linear aliphatic alpha,omega-C2-C12-diol or a combination of two diols, wherein in the case of diol combination, each of the diols makes up at least 10 mol % of the diols of the diol combination and the diol combination consists of at least 80 mol % of bisphenol A or of at least one linear aliphatic alpha,omega-C2-C12-diol.

15. A process for the preparation of a coating layer, comprising the successive steps:
1) applying a coating layer from a coating composition of claim 1,
2) optionally, flashing the applied coating layer to remove solvent and/or water, and
3) thermally curing the coating layer at an object temperature above the melting temperature of the at least one polyurethane resin B.

16. The process of claim 15, wherein the coating layer is selected from the group consisting of a single-layer coating and a coating layer within a multilayer coating.

17. The process of claim 16, wherein the coating layer within the multilayer coating is an automotive multilayer coating on a substrate selected from the group consisting of automotive bodies and automotive body parts.

18. The process of claim 17, wherein the coating layer is selected from the group consisting of a primer surfacer layer, an outer clear top coat layer and a transparent sealing layer.

* * * * *